(12) United States Patent
Higashiyama et al.

(10) Patent No.: US 10,788,074 B2
(45) Date of Patent: Sep. 29, 2020

(54) ROLLING BEARING DEVICE

(71) Applicant: JTEKT CORPORATION, Osaka-shi, Osaka (JP)

(72) Inventors: Yoshimichi Higashiyama, Kashihara (JP); Yusuke Ueda, Tondabayashi (JP); Tsukasa Sakazaki, Kizugawa (JP)

(73) Assignee: JTEKT CORPORATION, Osaka-shi (JP)

( * ) Notice: Subject to any disclaimer, the term of this patent is extended or adjusted under 35 U.S.C. 154(b) by 162 days.

(21) Appl. No.: 16/136,579

(22) Filed: Sep. 20, 2018

(65) Prior Publication Data

US 2019/0093704 A1 Mar. 28, 2019

(30) Foreign Application Priority Data

Sep. 27, 2017 (JP) ................. 2017-186253

(51) Int. Cl.
| | |
|---|---|
| *F16C 32/04* | (2006.01) |
| *H02K 21/00* | (2006.01) |
| *F16C 41/00* | (2006.01) |
| *F16C 33/66* | (2006.01) |
| *H02K 7/18* | (2006.01) |
| *H02K 5/173* | (2006.01) |

(Continued)

(52) U.S. Cl.
CPC ........ *F16C 32/0459* (2013.01); *F16C 32/047* (2013.01); *F16C 33/6674* (2013.01); *F16C 41/004* (2013.01); *H02K 7/1807* (2013.01); *H02K 21/00* (2013.01); *F16C 19/06* (2013.01); *F16C 32/041* (2013.01); *F16C 41/007* (2013.01); *F16C 2202/36* (2013.01); *F16C 2380/26* (2013.01); *H02K 5/173* (2013.01); *H02K 7/09* (2013.01)

(58) Field of Classification Search
CPC .......... H02K 21/00; H02K 5/173; H02K 7/09; H02K 7/1807; H02K 21/44; H02K 1/223; H02K 21/042
USPC .................................................. 310/181, 90.5
See application file for complete search history.

(56) References Cited

U.S. PATENT DOCUMENTS

| | | | | |
|---|---|---|---|---|
| 5,514,924 A | * | 5/1996 | McMullen | .......... F16C 32/0465 310/90.5 |
| 6,121,704 A | * | 9/2000 | Fukuyama | .......... F16C 32/0459 310/90.5 |
| 9,514,904 B2 | * | 12/2016 | Dai | ........................ H01H 36/00 |

(Continued)

FOREIGN PATENT DOCUMENTS

JP 2007-164811 A 6/2007

*Primary Examiner* — Bernard Rojas
(74) *Attorney, Agent, or Firm* — Oliff PLC (57) ABSTRACT

A rolling bearing device includes a bearing portion and a power generation portion. The power generation portion has a plurality of projecting portions provided on an outer ring spacer, a pair of core members provided on an inner ring spacer, a magnet, and a coil. The power generation portion generates an induced current in the coil as the projecting portions pass in the vicinity of first side end portions of the core members during rotation. There are two different loop paths along which magnetism generated by the magnet flows: a first loop path formed when the projecting portions are close to the first side end portions of the core members; and a second loop path formed when the projecting portions and the first side end portions of the core members are away from each other.

11 Claims, 8 Drawing Sheets

(51) Int. Cl.
*F16C 19/06* (2006.01)
*H02K 7/09* (2006.01)

(56) References Cited

U.S. PATENT DOCUMENTS

| | | | | |
|---|---|---|---|---|
| 2002/0054719 | A1* | 5/2002 | Takizawa | F16C 19/527 |
| | | | | 384/448 |
| 2002/0153785 | A1* | 10/2002 | Fukuyama | H02K 7/14 |
| | | | | 310/66 |
| 2003/0173844 | A1* | 9/2003 | Iwamoto | F16C 41/004 |
| | | | | 310/90 |
| 2006/0165328 | A1* | 7/2006 | Ueno | F16N 7/38 |
| | | | | 384/462 |
| 2012/0181793 | A1* | 7/2012 | Hein | H02K 21/44 |
| | | | | 290/55 |
| 2016/0025141 | A1* | 1/2016 | Tanimoto | F16C 33/6651 |
| | | | | 384/473 |
| 2018/0372769 | A1* | 12/2018 | Gunji | B60B 27/0068 |
| 2020/0112229 | A1* | 4/2020 | Yabuta | H02K 5/16 |

* cited by examiner

Prior Art

FIG.8

Prior Art

ROLLING BEARING DEVICE

INCORPORATION BY REFERENCE

The disclosure of Japanese Patent Application No. 2017-186253 filed on Sep. 27, 2017, including the specification, drawings and abstract, is incorporated herein by reference in its entirety.

BACKGROUND OF THE INVENTION

1. Field of the Invention

The present invention relates to a rolling bearing device.

2. Description of the Related Art

A rolling bearing is widely used in various devices that have a rotary mechanism portion. It has been attempted to detect the rotational state of the rolling bearing using a sensor or the like in such devices. This detection requires electric power. It is conceivable that the electric power is supplied from a power source provided outside the rotary mechanism portion.

Figure 6:
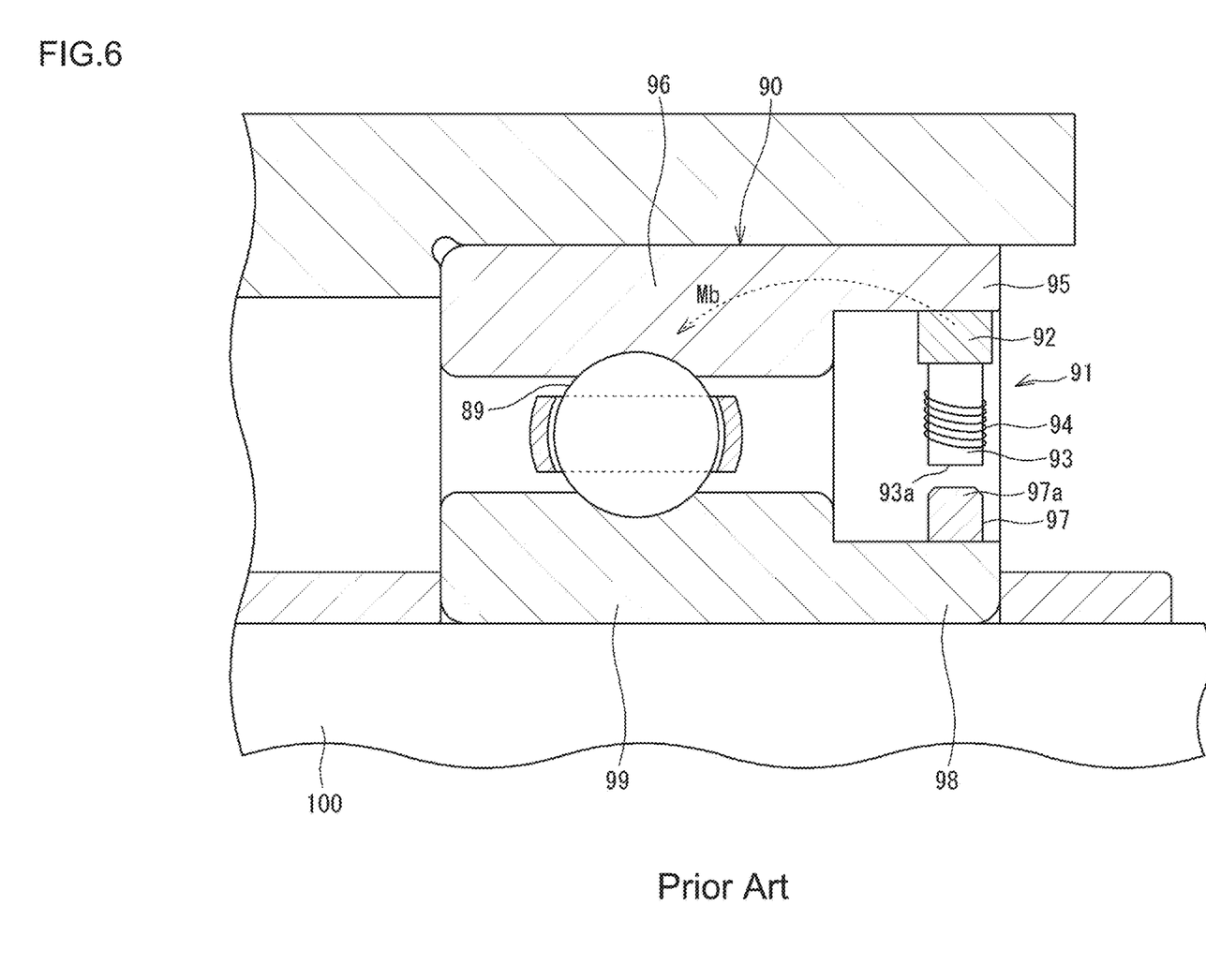
FIG. 6 is a sectional view illustrating a rolling bearing device according to the related art.

In the invention disclosed in Japanese Patent Application Publication No. 2007-164811 (JP 2007-164811 A), as illustrated in FIG. 6, a power generation portion 91 is provided together with a bearing portion (rolling bearing) 90. In the disclosed invention, the power generation portion 91 generates power on the basis of the rotational force of the bearing portion 90, and the obtained electric power is utilized to control a sensor etc. The rolling bearing device disclosed in JP 2007-164811 A further includes a charging circuit and a secondary battery. The generated electric power is stored in the secondary battery, and the electric power stored in the secondary battery is used to control the sensor and transmit a signal detected by the sensor as necessary.

As illustrated in FIG. 6, a gear portion 97 is provided on a rotary portion 98 that is integral with an inner ring 99 of the bearing portion 90. A pole piece 93 around which a coil 94 is wound and a magnet 92 are provided on a stationary portion 95 that is integral with an outer ring 96 of the bearing portion 90. When a rotary shaft 100 is rotated, the gear portion 97 is rotated together with the inner ring 99 and the rotary portion 98. Consequently, a projecting portion 97a of the gear portion 97 passes in the vicinity of an end portion 93a of the pole piece 93. Therefore, a magnetic field generated by the magnet 92 is varied to generate an induced current in the coil 94, so power is generated.

Figure 7:
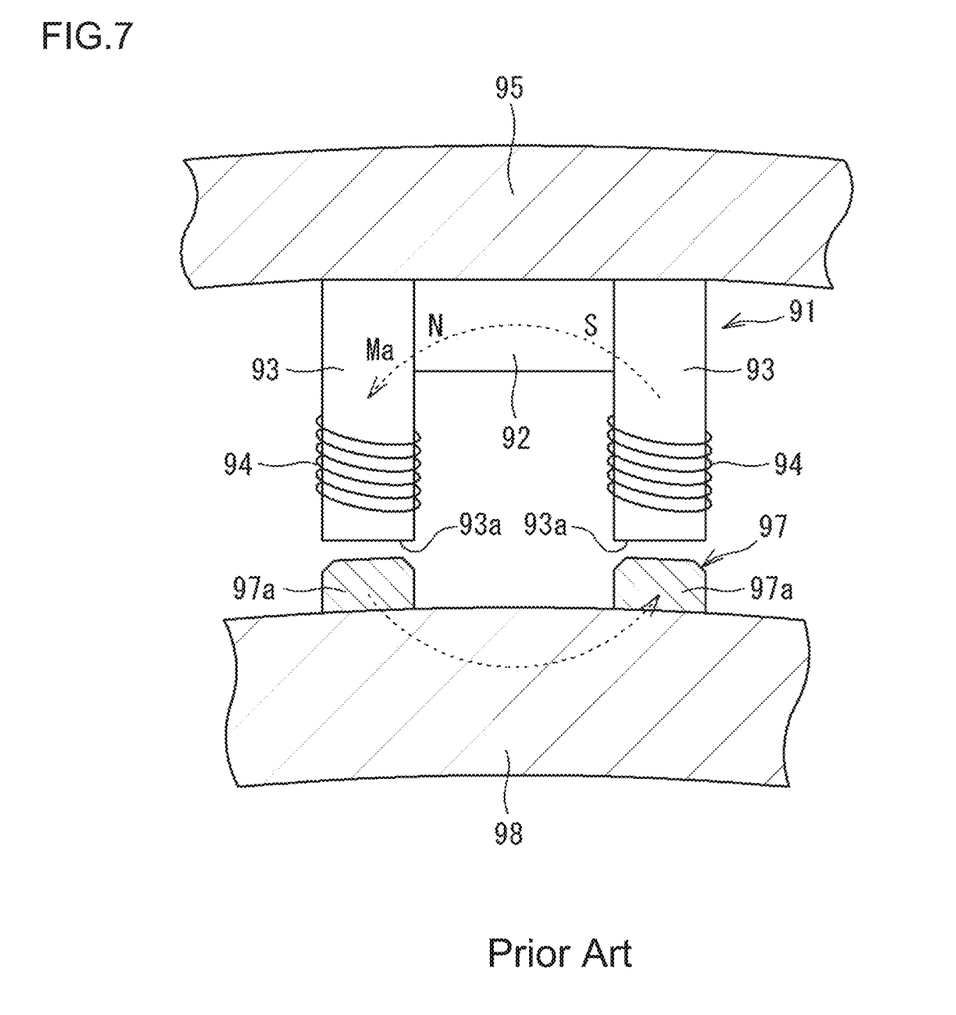
FIG. 7 illustrates a schematic configuration of a power generation portion according to the related art illustrated in FIG. 6 as seen in a direction that is parallel to the axial direction.

FIG. 7 illustrates a schematic configuration of the power generation portion 91 according to the related art illustrated in FIG. 6 as seen in a direction that is parallel to the axial direction. The gear portion 97 is provided with projecting portions 97a arranged side by side along the circumferential direction. A pair of pole pieces 93 is attached to the stationary portion 95. The pole pieces 93 are provided at intervals in the circumferential direction corresponding to the intervals at which the projecting portions 97a are provided. The magnet 92 is provided between the pole pieces 93, and the coils 94 are wound around the pole pieces 93.

Figure 8:
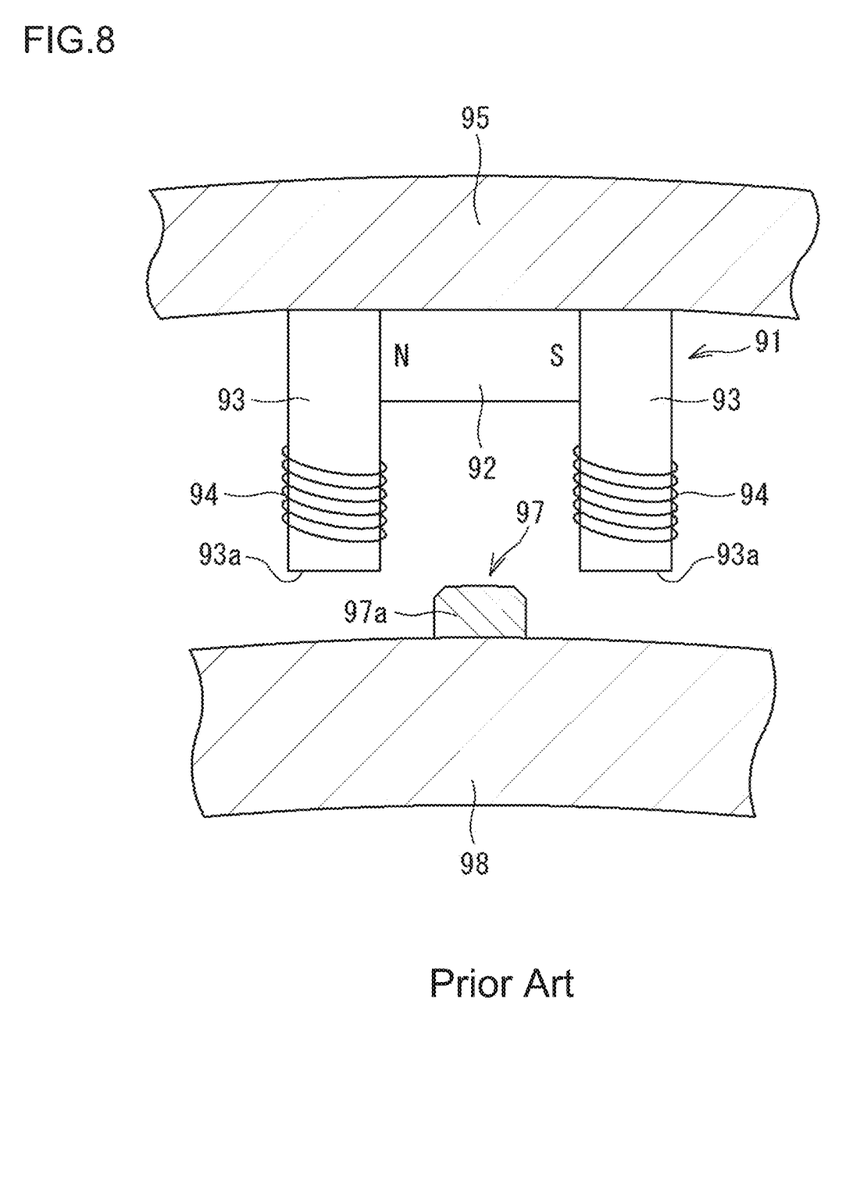
FIG. 8 illustrates a schematic configuration of the power generation portion according to the related art illustrated in FIG. 6 as seen in a direction that is parallel to the axial direction.

FIG. 7 illustrates a state (referred to as a "first state") in which the projecting portions 97a are close to the end portions 93a of the pole pieces 93. FIG. 8 illustrates a state (referred to as a "second state") in which the projecting portions 97a are away from the end portions 93a. When the rotary portion 98 (gear portion 97) is rotated, the first state and the second state are alternately repeated. In the first state, as illustrated in FIG. 7, magnetism (arrow Ma) generated by the magnet 92 flows along a loop path that passes through the pole pieces 93, the projecting portions 97a of the gear portion 97, and the centers of the coils 94.

In contrast, in the second state, as illustrated in FIG. 8, the projecting portions 97a are away from the end portions 93a. Therefore, there is a large magnetic resistance between the projecting portions 97a and the end portions 93a, 93a, and it is difficult for magnetism generated by the magnet 92 to flow along the loop path (arrow Ma in FIG. 7) described above which passes through the projecting portions 97a of the gear portion 97, and magnetism tends to flow along a path that passes through the stationary portion 95 and that includes the outer ring 96 side of the bearing portion 90 (arrow Mb) as illustrated in FIG. 6. That is, in the second state, magnetism of the magnet 92 leaks to the bearing portion 90 side. Therefore, in the second state, the outer ring 96 and a ball 89 that makes rolling contact with a raceway of the outer ring 96 may be magnetized, and foreign matter made of metal such as abrasion powder in the surroundings may adhere to the outer ring 96 or the ball 89. When such foreign matter made of metal adheres to the raceway for the outer ring 96 or the ball 89, the surface thereof may be damaged to reduce the life of the bearing.

SUMMARY OF THE INVENTION

It is an object of the present invention to provide a rolling bearing device that includes a power generation portion that is configured to generate power by generating an induced current during rotation of a bearing portion, in which adhesion of foreign matter made of metal such as abrasion powder to the bearing portion is suppressed.

According to an aspect of the present invention, a rolling bearing device includes: a bearing portion that has a stationary ring, a rotary ring on a radially inner or outer side of the stationary ring, and a plurality of rolling elements provided between the stationary ring and the rotary ring; a stationary portion that is stationary together with the stationary ring; a rotary portion provided on a radially inner or outer side of the stationary portion so as to be rotatable together with the rotary ring; and a power generation portion that has a plurality of projecting portions provided on one of the stationary portion and the rotary portion such that the projecting portions are arranged side by side in a rotational direction of the rotary portion, a pair of core members provided on the other of the stationary portion and the rotary portion such that the core members provided at intervals corresponding to intervals at which the projecting portions are provided, a magnet provided between the core members, and a coil wound around the core member. The power generation portion is configured to generate an induced current in the coil as the projecting portions relatively pass in a vicinity of first side end portions of the core members during rotation of the rotary portion. Magnetism generated by the magnet flows along a first loop path that passes through the first side end portions, the projecting portions, and a center of the coil in a first state in which the projecting portions are close to the first side end portions of the core members. Magnetism generated by the magnet flows along a second loop path that passes through second side end portions of the core members and the center of the coil in a second state in which the projecting portions and the first side end portions of the core members are away from each other.

BRIEF DESCRIPTION OF THE DRAWINGS

The foregoing and further features and advantages of the invention will become apparent from the following descrip

DETAILED DESCRIPTION OF EMBODIMENTS

Figure 1:
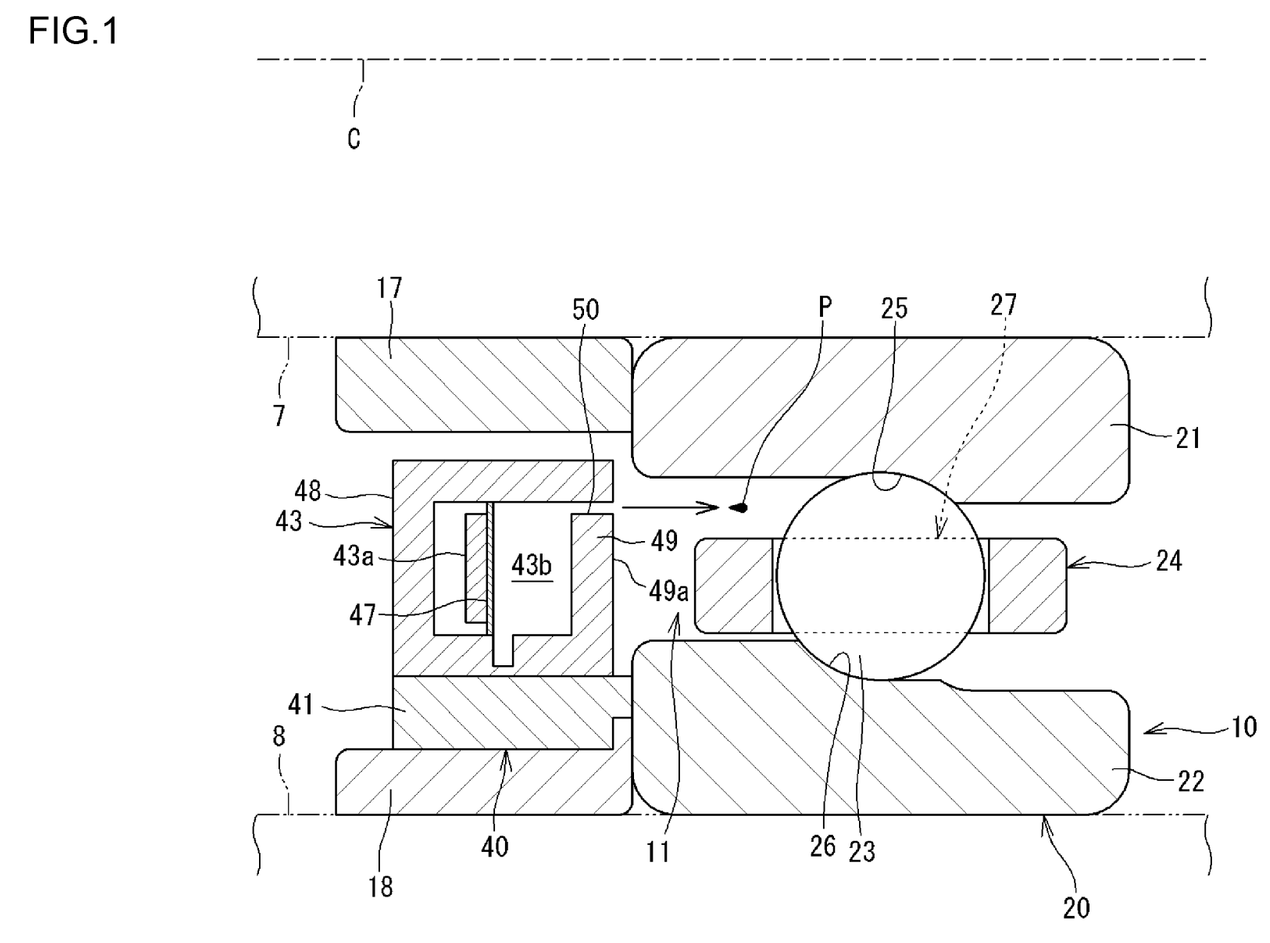
- FIG. 1 is a sectional view illustrating an example of a rolling bearing device.

FIG. 1 is a sectional view illustrating an example of a rolling bearing device. A rolling bearing device 10 (hereinafter referred to also as a "bearing device 10") illustrated in FIG. 1 rotatably supports a shaft (main spindle) 7 of a main spindle device of a machine tool, and is housed in a bearing housing 8 of the main spindle device. In FIG. 1, the shaft 7 and the bearing housing 8 are indicated by the long dashed double-short dashed lines. The rolling bearing device 10 according to the present invention is also applicable to devices other than machine tools. In the following description, a direction that is parallel to a central axis C of the bearing device 10 is referred to as an "axial direction", and a direction that is orthogonal to the axial direction is referred to as a "radial direction".

The bearing device 10 illustrated in FIG. 1 includes a bearing portion 20 and an oil supply unit 40. The bearing portion 20 has an inner ring 21, an outer ring 22, a plurality of balls (rolling elements) 23, and a cage 24 that holds the balls 23. The inner ring 21, the outer ring 22, the balls 23, and the cage 24 constitute a ball bearing (rolling bearing). The bearing device 10 further includes an inner ring spacer 17 in a cylindrical shape and an outer ring spacer 18 in a cylindrical shape.

The oil supply unit 40 is in a circular ring shape as a whole, and is provided adjacent to the bearing portion 20 in the axial direction. The oil supply unit 40 according to the present embodiment is provided on the radially inner side of the outer ring spacer 18, and positioned adjacent to an annular space 11 in the axial direction. The annular space 11 is formed between the inner ring 21 and the outer ring 22. The oil supply unit 40 has a function of supplying lubricating oil to the annular space 11. The configuration and the function of the oil supply unit 40 will be described later. Although not illustrated, the oil supply unit 40 (body portion 41 to be discussed later) and the outer ring spacer 18 may be integrated with each other so that the oil supply unit 40 functions as an outer ring spacer.

In the present embodiment, the outer ring 22 and the outer ring spacer 18 are attached to the bearing housing 8 so as not to be rotatable, and the inner ring 21 and the inner ring spacer 17 are rotatable together with the shaft 7. Thus, the outer ring 22 serves as a stationary ring that is not rotatable, and the inner ring 21 serves as a rotary ring that is rotatable together with the shaft 7. The outer ring spacer 18 serves as a stationary portion, and the inner ring spacer 17 serves as a rotary portion.

The inner ring 21 is a cylindrical member externally fitted on the shaft 7. A raceway (hereinafter referred to as an "inner ring raceway 25") is formed on the outer periphery of the inner ring 21. In the present embodiment, the inner ring 21 and the inner ring spacer 17 are separate from each other. However, the inner ring 21 and the inner ring spacer 17 may be (inseparably) integral with each other, although not illustrated. The outer ring 22 is a cylindrical member fixed to the inner peripheral surface of the bearing housing 8. A raceway (hereinafter referred to as an "outer ring raceway 26") is formed on the inner periphery of the outer ring 22. In the present embodiment, the outer ring 22 and the outer ring spacer 18 are separate from each other. However, the outer ring 22 and the outer ring spacer 18 may be (inseparably) integral with each other, although not illustrated.

The balls 23 are interposed between the inner ring 21 and the outer ring 22, and rolled on the inner ring raceway 25 and the outer ring raceway 26. The cage 24 has an annular shape, and is provided with a plurality of pockets 27 along the circumferential direction. The pockets 27 house the respective balls 23. The balls 23 and the cage 24 are disposed in the annular space 11.

Figure 2:
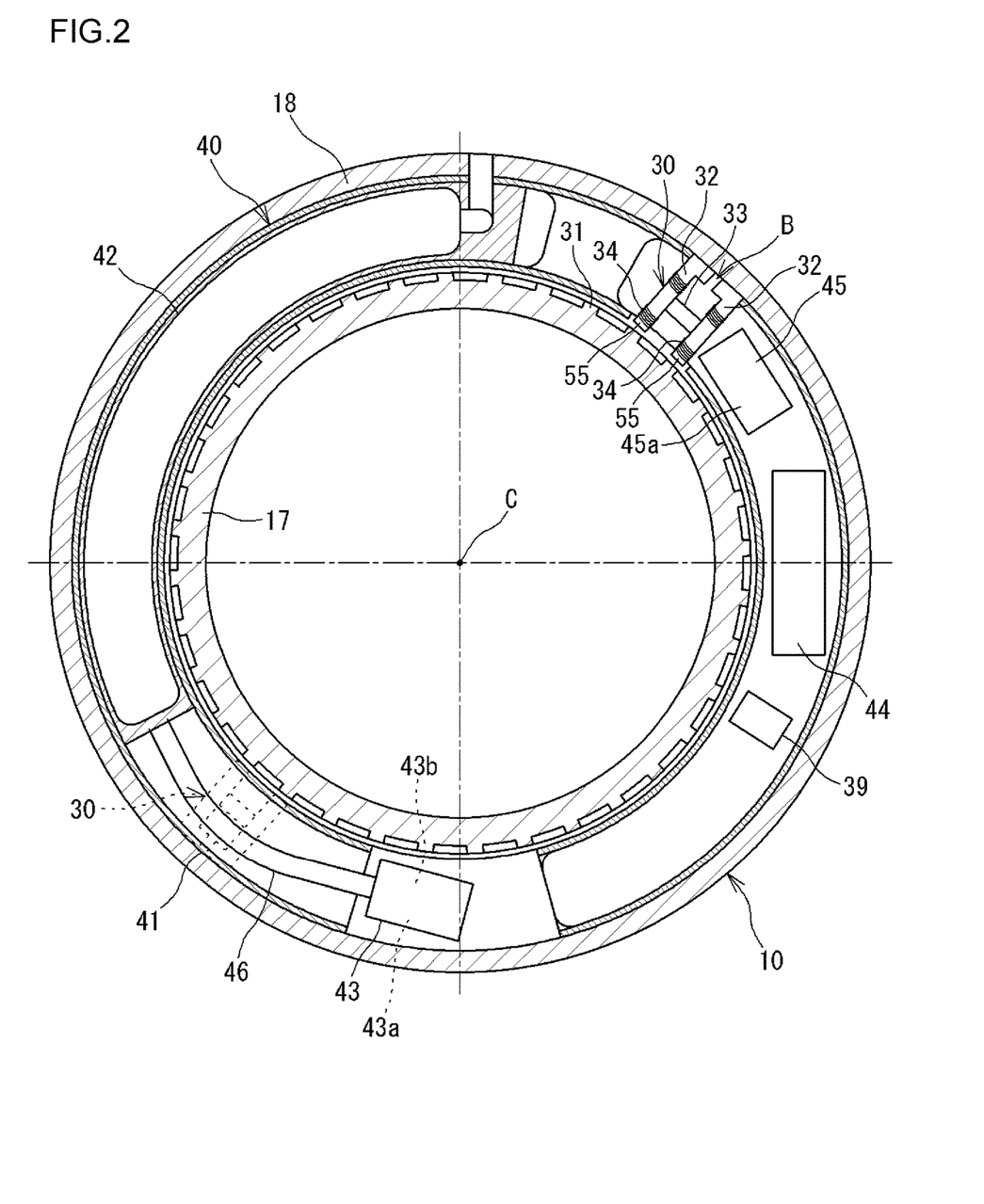
FIG. 2 is a cross-sectional view of an oil supply unit as seen in the axial direction.

FIG. 2 is a cross-sectional view of the inner ring spacer 17, the oil supply unit 40, and the outer ring spacer 18 as seen in the axial direction. The oil supply unit 40 according to the present embodiment has a tank 42, a pump 43, a control portion 44, a power source portion 45, a sensor 39, and a power generation portion 30. Such components are provided in an annular body portion 41 of the oil supply unit 40. The body portion 41 is attached to the inner peripheral side of the outer ring spacer 18, and has a function as a frame that holds the pump 43 etc. The body portion 41 is a circular ring member in which hollow spaces are formed. The tank 42, the pump 43, the control portion 44, the power source portion 45, the sensor 39, and the power generation portion 30 are provided in the hollow spaces.

In FIG. 2, the tank 42 stores lubricating oil (oil), and is connected to the pump 43 through piping 46 in order to cause the lubricating oil to flow to the pump 43. In FIG. 1, the pump 43 has a function of supplying lubricating oil to the annular space 11 of the bearing portion 20. In order to demonstrate this function, the pump 43 has a pump body 48 provided with an ejection port (nozzle) 50 that discharges lubricating oil. The pump body 48 has an oil chamber (internal space) 43b, which is a space that is connected to the ejection port 50 and that stores lubricating oil, and a piezoelectric element 43a. An elastically deformable diaphragm 47 that constitutes a part of a wall of the oil chamber 43b is provided in the pump body 48. The piezoelectric element 43a is attached to the diaphragm 47. When a voltage is applied to the piezoelectric element 43a and the piezoelectric element 43a deforms the diaphragm 47, the volume of the oil chamber 43b is varied.

The ejection port 50 according to the present embodiment is constituted of a minute through hole formed in a wall portion 49 of the pump body 48. The ejection port 50 opens in a side surface 49a of the wall portion 49. The side surface 49a in which the ejection port 50 opens faces a part of the annular space 11.

As described above, when the piezoelectric element 43a operates, the volume of the oil chamber 43b is varied, which allows lubricating oil in the oil chamber 43b to be discharged from the ejection port 50 to the annular space 11 of the bearing portion 20. In particular, when the piezoelectric element 43a operates, lubricating oil is discharged from the ejection port 50 at an initial velocity. That is, the oil droplets P fly from the ejection port 50. The ejection port 50 opens toward the inner ring raceway 25 of the bearing portion 20. The oil droplets P which are discharged from the ejection port 50 can hit the balls 23, or hit the inner ring raceway 25 even if they pass through a space between the balls 23 which are adjacent to each other.

In FIG. 2, the control portion 44 has a function of controlling the timing to cause the pump 43 to operate. The power source portion 45 supplies electric power for operation of the pump 43, the control portion 44, and the sensor 39. The power source portion 45 has a secondary battery 45a that is chargeable. The power generation portion 30 can generate power through rotation of the bearing portion 20 (as described later), and the generated electric power is stored in the secondary battery 45a. The electric power stored in the secondary battery 45a is used as electric power for operation of the pump 43, the control portion 44, and the sensor 39.

From the above, the pump 43 is configured to eject lubricating oil in the tank 42 (oil chamber 43b) (cause lubricating oil to fly) from the ejection port 50 toward a target of the bearing portion 20 in the form of the oil droplets P. From the viewpoint of efficient use of lubricating oil, the pump 43 ejects a determined amount of the oil droplets P in one discharge operation to cause the oil droplets P to reach the target of the bearing portion 20. Several picoliters to several nanoliters of lubricating oil are ejected from the ejection port 50 in the form of the oil droplets Pin one operation of the pump 43. In the present embodiment, the target is the balls 23 and the inner ring raceway 25.

Figure 3:
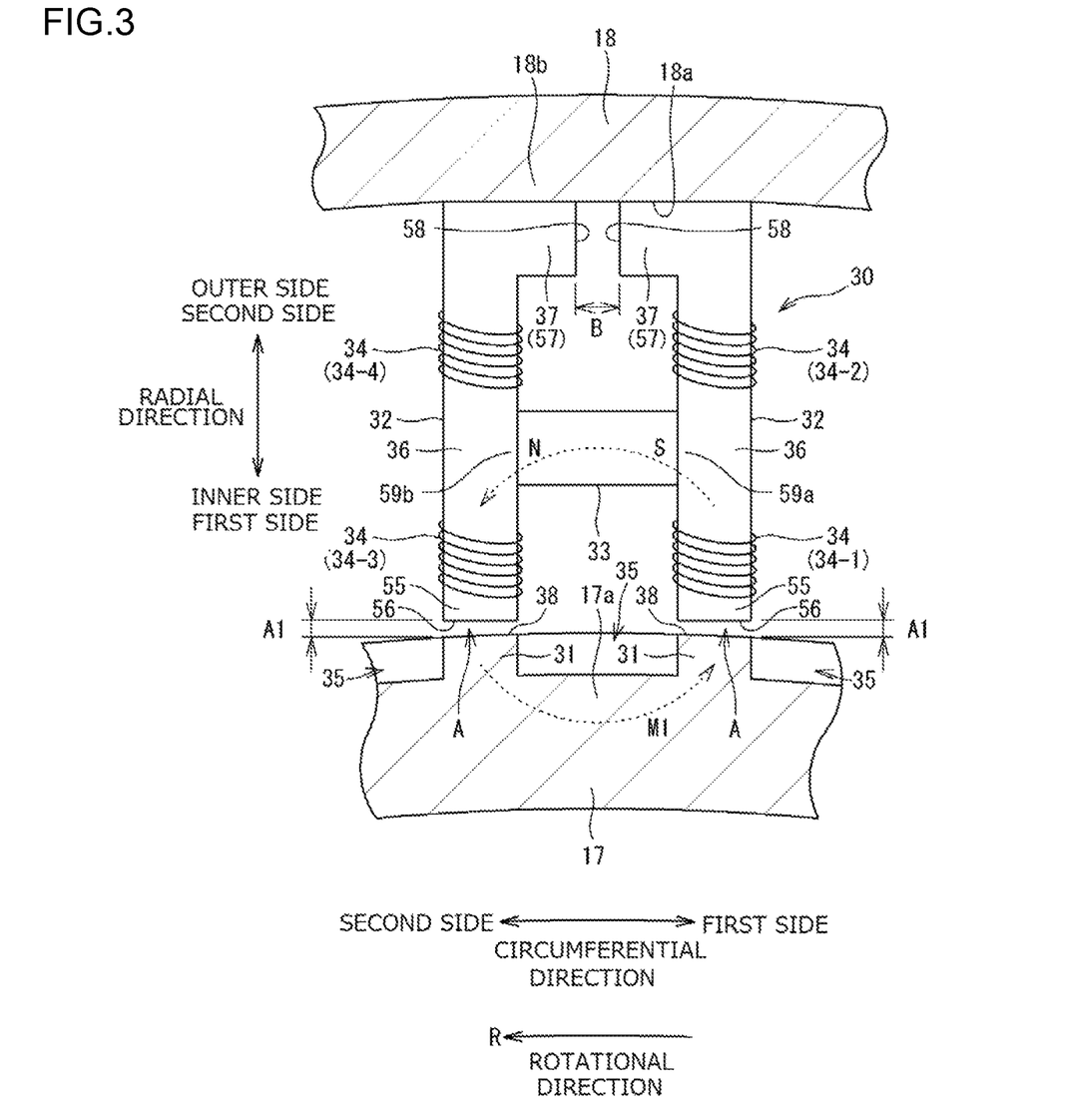
FIG. 3 illustrates a schematic configuration of a power generation portion.

FIG. 3 illustrates a schematic configuration of the power generation portion 30, illustrating the power generation portion 30 as seen in the axial direction. The power generation portion 30 has projecting portions 31, core members 32, a magnet 33, and coils 34. In the present embodiment, the projecting portions 31 are provided on the inner ring spacer 17 side, and the core members 32, the magnet 33, and the coils 34 are provided on the outer ring spacer 18 side. The projecting portions 31, the inner ring spacer 17, and the core members 32 are formed from a magnetic body, and formed from carbon steel or bearing steel (ferrous metal material), for example.

Figure 4:
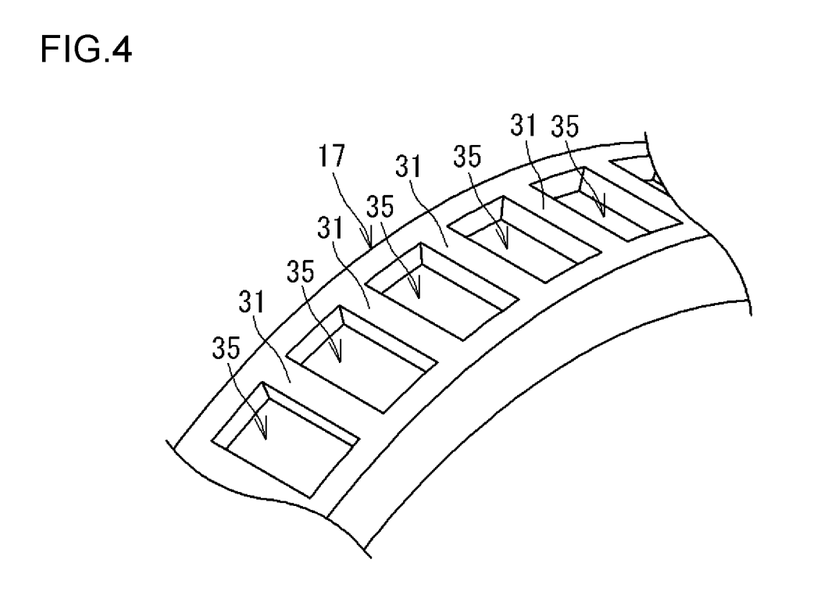
FIG. 4 is a perspective view illustrating a part of an inner ring spacer.

In the present embodiment, the inner ring spacer 17 and the plurality of projecting portions 31 are formed as the same member. The projecting portions 31 are arranged side by side along the circumferential direction of the inner ring spacer 17. A direction from a first side toward a second side in the circumferential direction coincides with the rotational direction of the inner ring spacer 17 (direction of an "arrow R" in FIG. 3). The projecting portions 31 are provided at equal intervals over the entire circumference, and the inner ring spacer 17 has a gear shape. In the present embodiment, as illustrated in FIG. 4, a plurality of recessed portions 35 is provided in the outer periphery of the inner ring spacer 17 which is in a cylindrical shape. The projecting portions 31 are provided between the recessed portions 35 which are adjacent to each other in the circumferential direction.

In FIG. 3, a pair of core members 32 is provided on the outer ring spacer 18 side. The core members 32 have a bar shape. The pair of core members 32 forms a set. The core members 32 are arranged side by side in the circumferential direction. Each core member 32 has a shaft portion 36 that extends in the radial direction, and a bent portion 37 that extends in the circumferential direction from an end portion of the shaft portion 36 on the radially outer side. The core member 32 on the first side in the circumferential direction and the core member 32 on the second side in the circumferential direction are the same in form as each other, but are attached in opposite directions. The cross-sectional areas of the shaft portion 36 and the bent portion 37 are constant, rather than being varied. A first side end portion 55, in the radial direction, of each core member 32 (shaft portion 36) is disposed in proximity to the inner ring spacer 17. An end surface 56 of the first side end portion 55 faces the projecting portion 31 with a gap A therebetween. A state (the state illustrated in FIG. 3) in which the end surface 56 of the first side end portion 55 and a radially outer side surface 38 of the projecting portion 31 approach each other to make the gap A smallest is called a "first state". In the first state, in this manner, the first side end portions 55 of the core members 32 and two projecting portions 31 which are adjacent to each other in the circumferential direction face each other in the radial direction. That is, the core members 32 are provided at intervals (intervals in the circumferential direction) corresponding to the intervals at which the projecting portions 31 which are adjacent to each other in the circumferential direction are provided.

Figure 5:
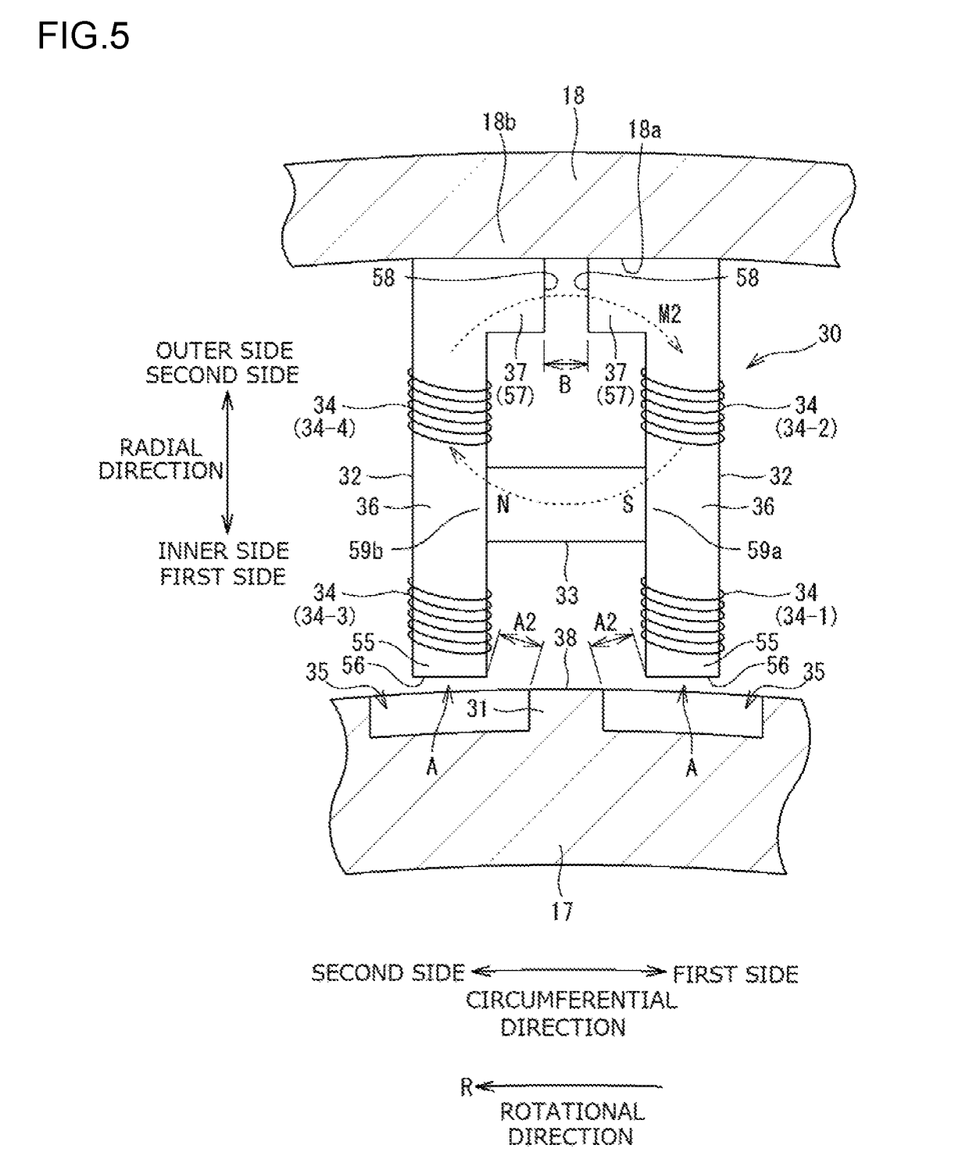
FIG. 5 illustrates a schematic configuration of the power generation portion.

The inner ring spacer 17 is rotatable. Thus, when the inner ring spacer 17 is rotated by half the pitch of the projecting portions 31 in the circumferential direction from the state illustrated in FIG. 3, the first side end portions 55 of the core members 32 and the projecting portions 31 are away from each other as illustrated in FIG. 5, and the first side end portions 55 and the projecting portions 31 do not face each other in the radial direction. In the state illustrated in FIG. 5, the projecting portion 31 is positioned at the middle between the first side end portions 55 in the circumferential direction. Such a state is called a "second state". In the first state illustrated in FIG. 3, the gap A between the first side end portion 55 of each core member 32 and the projecting portion 31 is minimized, and thus the gap A on the first side in the circumferential direction and the gap A on the second side in the circumferential direction are equal to each other. In the second state illustrated in FIG. 5, the gap A is larger than that in the first state, and the gap A on the first side in the circumferential direction and the gap A on the second side in the circumferential direction are equal to each other. In the following description, the gap A in the first state (FIG. 3) is referred to as a "first gap A1", and the gap A in the second state is referred to as a "second gap A2".

In FIGS. 3 and 5, a gap B in the circumferential direction is formed between an end surface 58 of the bent portion 37 of the core members 32 on the first side and an end surface 58 of the bent portion 37 of the core member 32 on the second side. While the gap A is varied (varied periodically) in accordance with the relative positions of the core member 32 and the projecting portion 31 in the circumferential direction (rotational direction), the gap B is constant since the core members 32 are fixed to the outer ring spacer 18. Hence, the gap B is called a "constant gap B". In this manner, the constant gap B is provided between second side end portions 57, in the radial direction, of the core members 32.

The gaps A (first gap A1 and second gap A2) and the gap B will be described. As described above, the gap B which is provided between the second side end portions 57 of the core members 32 is the "constant gap B", and is not varied. In contrast, the gaps A are varied periodically (first gap A1 and second gap A2).

In the first state illustrated in FIG. 3, the constant gap B is set so as to be more than twice the first gap A1 which is formed between the projecting portion 31 and the first side end portion 55 of the core member 32 (B>2×(A1)). In the second state illustrated in FIG. 5, the constant gap B is set so as to be less than twice the second gap A2 which is formed between the projecting portion 31 and the first side end portion 55 of the core member 32 (B<2×(A2)).

In the present embodiment, the core members 32 are directly and fixedly attached to an inner peripheral surface 18a of the outer ring spacer 18. The outer ring spacer 18 is formed from a non-magnetic body, and formed from austenitic stainless steel, for example. Only a region of the outer ring spacer 18 to which the core members 32 are attached may be formed from a non-magnetic body. It is only necessary that at least an attachment portion 18b of the outer ring spacer 18 to which the core members 32 are attached should be made of a non-magnetic body. In this manner, the core members 32 are attached to a non-magnetic body portion (18b). Thus, magnetism generated by the magnet 33 can be suppressed from flowing through the outer ring spacer 18 to pass by way of the bearing portion 20 as described later.

The magnet 33 is provided between the core members 32. The magnet 33 is a permanent magnet. In the present embodiment, a ferrite magnet is used as the magnet 33. The magnet 33 is a bar magnet, and is provided such that an end portion (one of the poles; S pole) thereof on the first side in the longitudinal direction (corresponding to the "circumferential direction" in the present embodiment) is in contact with an intermediate portion 59a, in the longitudinal direction (corresponding to the "radial direction" in the present embodiment), of the core members 32 (shaft portion 36) on the first side. The bar magnet (magnet 33) is also provided such that an end portion (the other pole; N pole) thereof on the second side in the longitudinal direction is in contact with an intermediate portion 59b, in the longitudinal direction, of the core member 32 (shaft portion 36) on the second side.

The coils 34 are wound around the core members 32. As illustrated in FIG. 3, two coils 34 are provided on the core member (first core member) 32 which is positioned on first side (right side in FIG. 3) in the circumferential direction such that one of the coils 34 is provided on the first side (radially inner side) in the longitudinal direction with respect to the magnet 33 located at the middle of the core member 32 in the longitudinal direction and that the other coils 34 is provided on the second side (radially outer side) in the longitudinal direction with respect to the magnet 33. The coil 34 on the radially inner side is referred to as a first coil 34-1, and the coil 34 on the radially outer side is referred to as a second coil 34-2. Similarly, two coils 34 are provided on the core member (second core member) 32 which is positioned on the second side (left side in FIG. 3) in the circumferential direction such that one of the coils 34 is provided on the first side (radially inner side) in the longitudinal direction with respect to the magnet 33 located at the middle of the core member 32 in the longitudinal direction and that the other coil 34 is provided on the second side (radially outer side) in the longitudinal direction with respect to the magnet 33. The coil 34 on the radially inner side is referred to as a third coil 34-3, and the coil 34 on the radially outer side is referred to as a fourth coil 34-4. The coils 34-1 to 34-4 are electrically connected to the secondary battery 45a (see FIG. 2) through a voltage boost circuit portion (not illustrated).

In the power generation portion 30 configured as described above, the first state illustrated in FIG. 3 and the second state illustrated in FIG. 5 are alternately repeated when the inner ring spacer 17 (rotary portion) is rotated. Consequently, magnetism (a magnetic field) generated by the magnet 33 is varied as the projecting portions 31 pass in the vicinity of the first side end portions 55 of the core members 32. That is, an induced current can be generated in the coils 34 as the projecting portions 31 (relatively) pass in the vicinity of the first side end portions 55 of the core members 32 during rotation of the inner ring spacer 17 (rotary portion). As a result, with the power generation portion 30 according to the present embodiment, the secondary battery 45a can be charged with power generated by an induced electromotive force generated in the coils 34.

The function of the power generation portion 30 configured as described above will be described. In the present embodiment, as illustrated in FIGS. 3 and 5, the flow of magnetism generated by the magnet 33 as the inner ring spacer 17 is rotated takes the following two forms <1>and <2>, which are alternately repeated.

<1>A form in which, as illustrated in FIG. 3, magnetism generated by the magnet 33 flows along a first loop path M1 that passes through the center of the coil 34-3 on the left side, the first side end portion 55 of the core member 32 on the left side, the first gap A1 on the left side, the projecting portion 31 on the left side, a part 17a of the inner ring spacer 17, the projecting portion 31 on the right side, the first gap A1 on the right side, the first side end portion 55 of the core member 32 on the right side, and the center of the coil 34-1 on the right side.

<2>A form in which, as illustrated in FIG. 5, magnetism generated by the magnet 33 flows along a second loop path M2 that passes through the center of the coil 34-4 on the left side, the second side end portion 57 (bent portion 37) of the core member 32 on the left side, the constant gap B, the second side end portion 57 (bent portion 37) of the core member 32 on the right side, and the center of the coil 34-2 on the right side.

That is, in the form in which magnetism flows along the first loop path M1 (see FIG. 3), magnetism generated by the magnet 33 flows through the first side end portions 55 of the core members 32, the projecting portions 31, and the centers of the coils 34-1, 34-3. In the form in which magnetism flows along the second loop path M2 (see FIG. 5), in contrast, magnetism generated by the magnet 33 flows through the second side end portions 57 of the core members 32 and the centers of the coils 34-4, 34-2.

The first loop path M1 (see FIG. 3) includes the first gap A1 at two locations, and the second loop path M2 (FIG. 5) includes the constant gap B at one location. In the present embodiment, the area of the end surface 56 of the first side end portion 55 in the radial direction and the area of the end surface 58 of the second side end portion 57 (bent portion 37) in the radial direction are the same as each other in each of the core members 32.

Magnetism generated by the magnet 33 flows along a path with a small magnetic resistance, and a path has a smaller magnetic resistance as the path includes a smaller gap. In the first state illustrated in FIG. 3, as described above, the constant gap B is larger than twice the first gap A1 (B>2×(A1)). Therefore, in the first state, the magnetic resistance through the first loop path M1 is smaller than the magnetic resistance through the second loop path M2 which passes through the constant gap B. Hence, in the first state, magnetism of the magnet 33 flows along the first loop path M1 which includes the first gap A1 at two locations, rather than the second loop path M2 which includes the constant gap B. In contrast, in the second state illustrated in FIG. 5, as described above, the constant gap B is smaller than twice the second gap A2 (B<2×(A2)). Therefore, in the second state, the magnetic resistance through the second loop path M2 is smaller than the magnetic resistance through a loop path that includes the second gap A2 at two locations. Hence, in the second state, magnetism of the magnet 33 flows along the second loop path M2 which includes the constant gap B, rather than the loop path which includes the second gap A2 at two locations.

In the bearing device 10 according to the present embodiment, as described above, in the first state (see FIG. 3) in which the projecting portions 31 are close to the first side end portions 55 of the core members 32, magnetism generated by the magnet 33 flows along the first loop path M1 which passes through the first side end portions 55, the projecting portions 31, and the centers of the coils 34. In the second state (see FIG. 5) in which the projecting portions 31 are away from the first side end portions 55 of the core members 32, in contrast, magnetism generated by the magnet 33 flows along the second loop path M2 which passes through the second side end portions 57 of the core members 32 and the centers of the coils 34. While the inner ring spacer 17 is rotated, the first state and the second state are alternately repeated, and magnetism generated by the magnet 33 is alternately switched between the first loop path M1 and the second loop path M2. Therefore, a flow of magnetism generated by the magnet 33 is formed in the power generation portion 30 whether in the first state or the second state (i.e. a flow of magnetism is always formed in the power generation portion 30), so that magnetism generated by the magnet 33 is suppressed from flowing to pass by way of the bearing portion 20.

The related art will be described. As illustrated in FIG. 8, in a state in which the projecting portions 97a are away from the end portions 93a of the pole pieces 93 which serve as core members (corresponding to the second state illustrated in FIG. 5), it is difficult for magnetism generated by the magnet 92 to flow along a loop path that passes through the projecting portion 97a. As illustrated in FIG. 6, magnetism generated by the magnet 92 tends to flow along a path (arrow Mb) that includes the outer ring 96 side of the shaft portion 90 through the stationary portion 95. In the present embodiment, in contrast, in the second state in which the projecting portions 31 are away from the first side end portions 55 of the core members 32, as illustrated in FIG. 5, magnetism generated by the magnet 33 flows along the second loop path M2 which passes through the second side end portions 57 of the core members 32, the constant gap B, and the centers of the coils 34 as described above. Therefore, in the present embodiment, magnetism can be suppressed from flowing through the outer ring spacer 18 to pass by way of the bearing portion 20. As a result, it is possible to suppress adhesion of foreign matter made of metal such as abrasion powder, for example, to the bearing portion 20.

In the present embodiment, the magnet 33 is provided between the intermediate portions 59a, 59b, in the longitudinal direction (radial direction), of the core members 32. The coils 34 are provided on the core members 32. In each core member, one of the coils 34 is provide on the first side (radially inner side) with respect to the magnet 33 located at the middle portion of the core member 32 in the longitudinal direction and the other coil 34 is provide on the second side (radially outer side) with respect to the magnet 33. Therefore, an induced current can be generated in some of the four coils 34-1 to 34-4 whether magnetism generated by the magnet 33 flows along the first loop path M1 or the second loop path M2, so that the power generation efficiency is improved. In the state illustrated in FIG. 8 which illustrates the related art, (substantially) no induced current is generated.

In the present embodiment, the inner ring spacer 17 which serves as a rotary portion that is rotatable together with the shaft 7 is provided with the plurality of projecting portions 31. The outer ring spacer 18 which serves as a stationary portion is provided with the core members 32 the magnet 33, and the plurality of coils 34. Therefore, even if the rotational speed of the shaft 7, the inner ring 21, and the inner ring spacer 17 becomes higher so that a larger centrifugal force acts on the various portions, the centrifugal force does not act on the magnet 33 and the coils 34 which are provided on the outer ring spacer 18 which serves as a stationary portion. Consequently, the bearing device 10 with a stable structure can be obtained.

As described in relation to FIG. 4, the inner ring spacer 17 which is provided with the projecting portions 31 is formed from an annular member. The plurality of recessed portions 35 is formed along the outer peripheral surface of the annular member, and the projecting portions 31 are provided between the recessed portions 35 which are adjacent to each other in the circumferential direction. Therefore, the plurality of projecting portions 31 can be provided in the range of the inner ring spacer 17, facilitating formation of the power generation portion 30 even if the space between the inner ring spacer 17 and the outer ring spacer 18 is narrow. With this configuration, the projecting portions 31 do not slip off because of a centrifugal force even in the case where the inner ring spacer 17 is rotated at a high speed.

In FIG. 2, a pair of core members 32 forms a set. The oil supply unit 40 is preferably provided with a plurality of sets of core members 32. In this case, the sets of core members 32, 32 are preferably disposed at equal intervals along the circumferential direction. For example, in FIG. 2, two sets of core members 32 are provided 180° apart from each other with reference to the central axis C. In this manner, disposing the sets of core members 32 uniformly along the circumferential direction prevents an offset load from acting on the inner ring spacer 17 because of the magnetic force of the magnet 33. In the case where it is difficult to install sets of core members 32 in the oil supply unit 40 because of the installation space, the magnet 33 disposed between the core members 32 and only one or more magnets that have the same magnetic force as the magnet 33 may be disposed uniformly along the circumferential direction. Consequently, action of an offset load on the inner ring spacer 17 can be prevented.

In the bearing device 10 according to the above embodiment, the inner ring 21 is a rotary ring, the outer ring 22 is a stationary ring, the inner ring spacer 17 is a rotary portion that is rotatable together with the inner ring 21, and the outer ring spacer 18 is a stationary portion. The stationary side and the rotary side may be reversed. The inner ring 21 and the inner ring spacer 17 may be on the stationary side, and the outer ring 22 and the outer ring spacer 18 may be on the rotary side. The rolling elements may be elements other than the balls 23. That is, the bearing portion 20 of the bearing device 10 may have a stationary ring, a rotary ring on the radially inner or outer side of the stationary ring, and a plurality of rolling elements provided between the stationary ring and the rotary ring. The bearing device 10 may include a stationary portion such as a spacer that is stationary together with the stationary ring, and a rotary portion such as a spacer provided on the radially inner or outer side of the stationary portion so as to be rotatable together with the rotary ring. The projecting portions 31 may be provided on one of the stationary portion and the rotary portion, and the core members 32, the magnet 33, and the coils 34 may be provided on the other. The configuration of the power generation portion 30 illustrated in FIGS. 3 and 5 may be inverted between the inner side and the outer side in the radial direction.

The embodiment disclosed above is exemplary in all respects, and is not limiting. That is, the rolling bearing device according to the present invention is not limited to the illustrated embodiment, and may be in other embodiments without departing from the scope of the present invention. In the above embodiment, as illustrated in FIG. 3, the coils 34 are provided on both the first core member 32 on the right side and the second core member 32 on the left side. However, the coils 34 may be provided on only one of the first core member 32 on the right side and the second core member 32 on the left side because of the installation space, for example. In this case, in particular, the first core member 32 and the second core member 32 may be formed differently from each other.

With the rolling bearing device according to the present invention, power can be generated by the power generation portion generating an induced current through rotation of the bearing portion. It is possible to suppress adhesion of foreign matter made of metal such as abrasion powder, for example, to the bearing portion.

What is claimed is:

1. A rolling bearing device comprising:
    a bearing portion that has a stationary ring, a rotary ring on a radially inner or outer side of the stationary ring, and a plurality of rolling elements provided between the stationary ring and the rotary ring;
    a stationary portion that is stationary together with the stationary ring;
    a rotary portion provided on a radially inner or outer side of the stationary portion so as to be rotatable together with the rotary ring; and
    a power generation portion that has a plurality of projecting portions provided on the rotary portion such that the projecting portions are arranged side by side in a rotational direction of the rotary portion, a pair of core members provided on of the stationary portion such that the core members are provided at intervals corresponding to intervals at which the projecting portions are provided, a magnet provided between the core members, and a coil wound around the core member, the power generation portion being configured to generate an induced current in the coil as the projecting portions relatively pass in a vicinity of first side end portions of the core members during rotation of the rotary portion, wherein:
    magnetism generated by the magnet flows along a first loop path that passes through the first side end portions, the projecting portions, and a center of the coil in a first state in which the projecting portions are close to the first side end portions of the core members;
    magnetism generated by the magnet flows along a second loop path that passes through second side end portions of the core members and the center of the coil in a second state in which the projecting portions and the first side end portions of the core members are away from each other;
    a constant gap is provided between the second side end portions of the core members, the constant gap being included in the second loop path;
    a magnetic resistance through the first loop path is smaller than a magnetic resistance through the second loop path in the first state; and
    the magnetic resistance through the second loop path is smaller than a magnetic resistance through a loop path that includes a gap formed between the projecting portion and the first side end portions of the core members in the second state.

2. The rolling bearing device according to claim 1 wherein:
    a constant gap is provided between the second side end portions of the core members;
    the constant gap is larger than twice a first gap formed between the projecting portion and the first side end portion of the core member in the first state; and
    the constant gap is smaller than twice a second gap formed between the projecting portion and the first side end portion of the core member in the second state.

3. The rolling bearing device according to claim 1, wherein:
    the rotary portion is provided with the projecting portions; and
    the stationary portion is provided with the core members, the magnet, and the coil.

4. The rolling bearing device according to claim 1, wherein
    the core members are attached to a non-magnetic body portion of the stationary portion.

5. The rolling bearing device according to claim 1, wherein:
    the rotary portion on which the projecting portions are provided is formed from an annular portion; and
    a plurality of recessed portions is formed along a peripheral surface of the annular portion, and the projecting portions are each provided between the recessed portions which are adjacent to each other in a circumferential direction.

6. The rolling bearing device according to claim 1, wherein
    the pair of core members forms a set, and a plurality of the sets of core members are provided on the stationary portion at equal intervals in a circumferential direction.

7. A rolling bearing device comprising:
    a bearing portion that has a stationary ring, a rotary ring on a radially inner or outer side of the stationary ring, and a plurality of rolling elements provided between the stationary ring and the rotary ring;
    a stationary portion that is stationary together with the stationary ring;
    a rotary portion provided on a radially inner or outer side of the stationary portion so as to be rotatable together with the rotary ring; and
    a power generation portion that has a plurality of projecting portions provided on the rotary portion such that the projecting portions are arranged side by side in a rotational direction of the rotary portion, a pair of core members provided on the stationary portion such that the core members are provided at intervals corresponding to intervals at which the projecting portions are provided, a magnet provided between the core members, and a coil wound around the core member, the power generation portion being configured to generate an induced current in the coil as the projecting portions relatively pass in a vicinity of first side end portions of the core members during rotation of the rotary portion, wherein:

magnetism generated by the magnet flows along a first loop path that passes through the first side end portions, the projecting portions, and a center of the coil in a first state in which the projecting portions are close to the first side end portions of the core members; and magnetism generated by the magnet flows along a second loop path that passes through second side end portions of the core members and the center of the coil in a second state in which the projecting portions and the first side end portions of the core members are away from each other;

the magnet is provided between respective intermediate portions, in a longitudinal direction, of the core members; and the coil is provided on each of a first side and a second side, in the longitudinal direction, of the core member with respect to the magnet which is located at a middle of the core member in the longitudinal direction.

the rotary portion is provided with the projecting portions; and the stationary portion is provided with the core members, the magnet, and the coil.

8. The rolling bearing device according to claim 7, wherein:

the rotary portion is provided with the projecting portions; and the stationary portion is provided with the core members, the magnet, and the coil.

9. The rolling bearing device according to claim 7, wherein the core members are attached to a non-magnetic body portion of the stationary portion.

10. The rolling bearing device according to claim 7, wherein:

the rotary portion on which the projecting portions are provided is formed from an annular portion; and a plurality of recessed portions is formed along a peripheral surface of the annular portion, and the projecting portions are each provided between the recessed portions which are adjacent to each other in a circumferential direction.

11. The rolling bearing device according to claim 7, wherein the pair of core members forms a set, and a plurality of the sets of core members are provided on the stationary portion at equal intervals in a circumferential direction.

* * * * *